United States Patent

[11] 3,611,995

| [72] | Inventor | Robert A. Murto |
| | | Goshen, Ind. |
| [21] | Appl. No. | 854,855 |
| [22] | Filed | Sept. 3, 1969 |
| [45] | Patented | Oct. 12, 1971 |
| [73] | Assignee | Chore-Time Equipment, Inc. |
| | | Milford, Ind. |

[54] TROUGH-TYPE POULTRY FEEDERS
30 Claims, 10 Drawing Figs.

[52] U.S. Cl. ...................................................... 119/18,
119/52, 119/61
[51] Int. Cl. .......................................................... A01k 05/00
[50] Field of Search ........................................... 119/61, 52,
18, 53; 222/182

[56] References Cited
UNITED STATES PATENTS

| 2,715,887 | 8/1955 | Flannery et al. ............... | 119/52 |
| 2,918,037 | 12/1959 | Polley............................ | 119/52 |
| 2,926,629 | 3/1960 | Hazen ........................... | 119/52 |
| 2,987,040 | 6/1961 | Piel ............................... | 119/52 |
| 3,130,708 | 4/1964 | MacKenzie.................... | 119/53 |
| 3,320,930 | 5/1967 | Pockman et al. .............. | 119/18 |

*Primary Examiner*—Hugh R. Chamblee
*Attorney*—Olson, Trexler, Wolters & Bushnell ABSTRACT: Feed-distributing apparatus for poultry or the like, of the type which include a trough, and conveyor means supplying feed to said trough. The apparatus provide a novel trough and conveyor tube construction which precludes packing of the feed within the trough and promotes more even distribution of said feed along the length of said trough. In addition, said apparatus also provide an improved control arrangement which affords more accurate and dependable regulation of the feeding cycle.

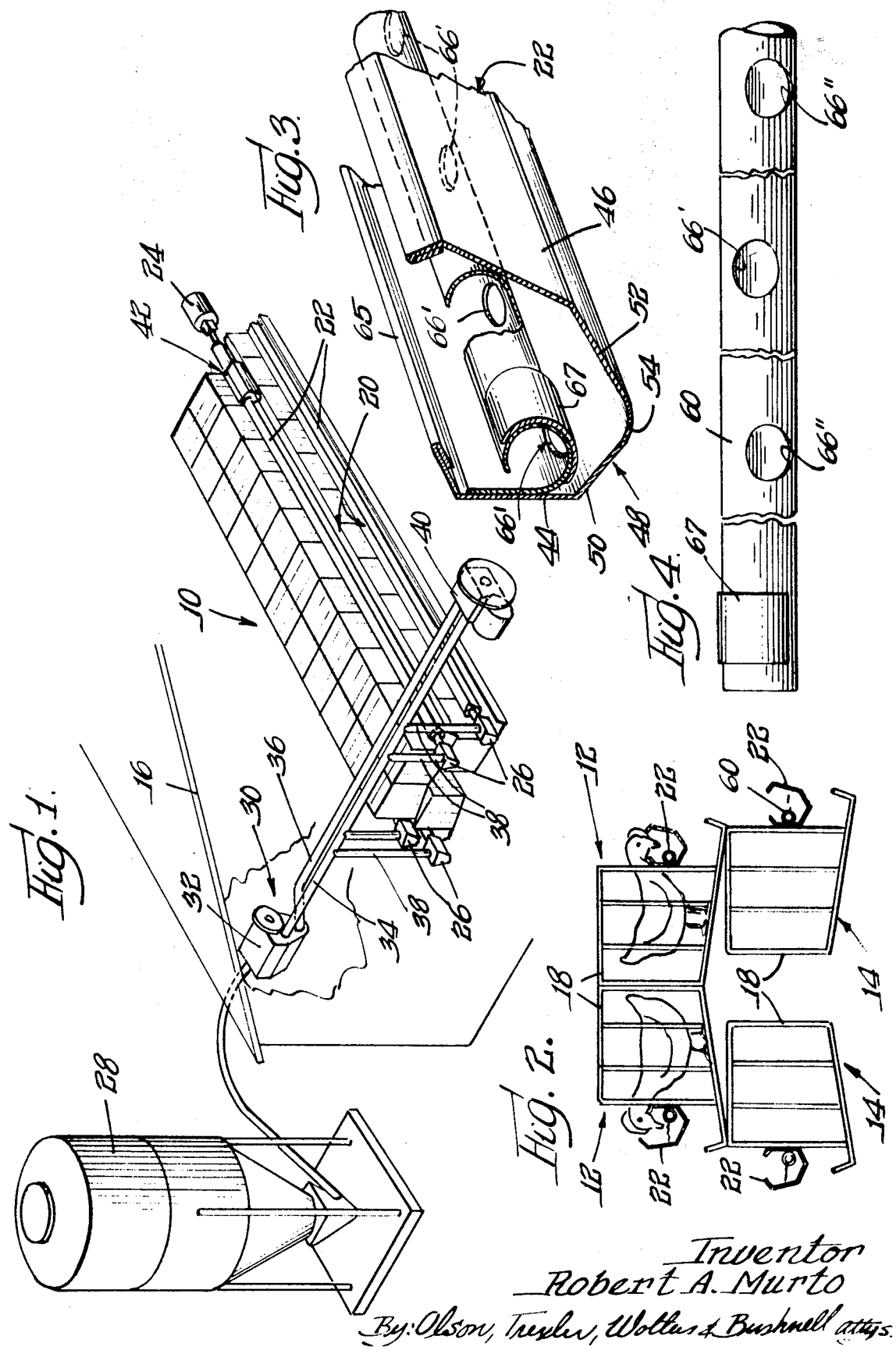

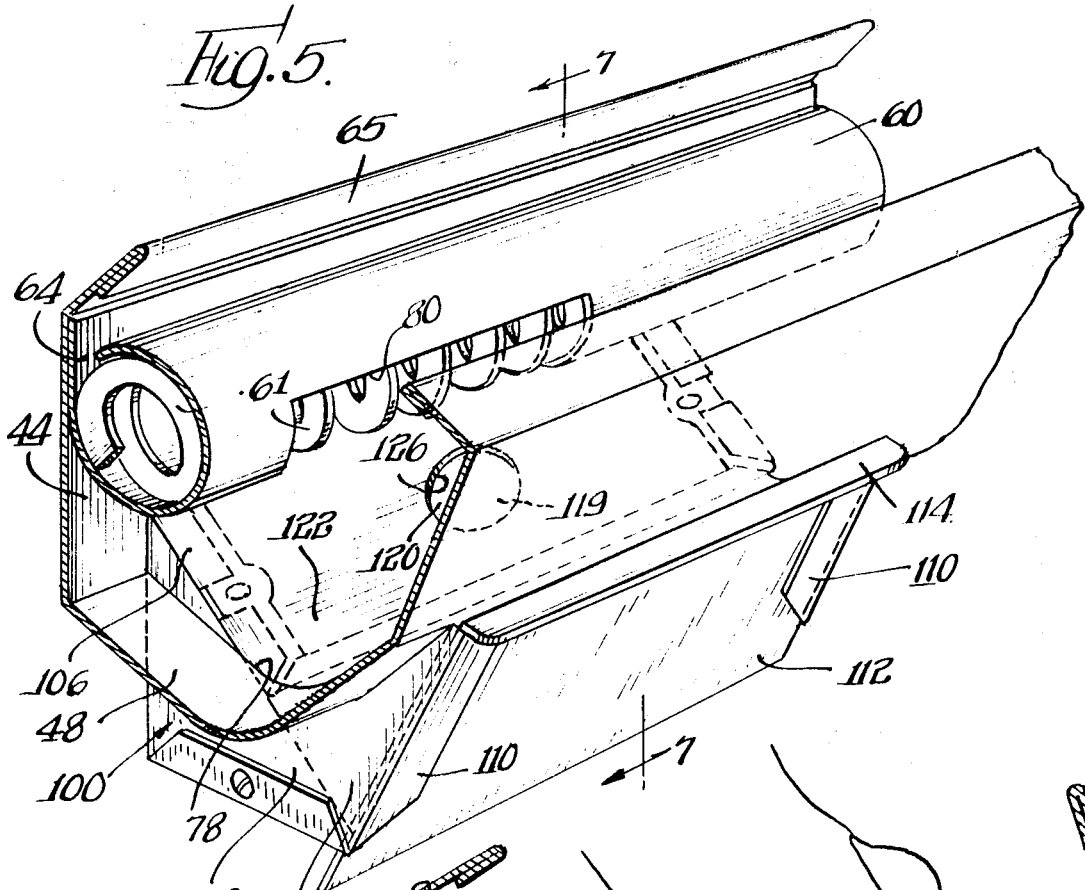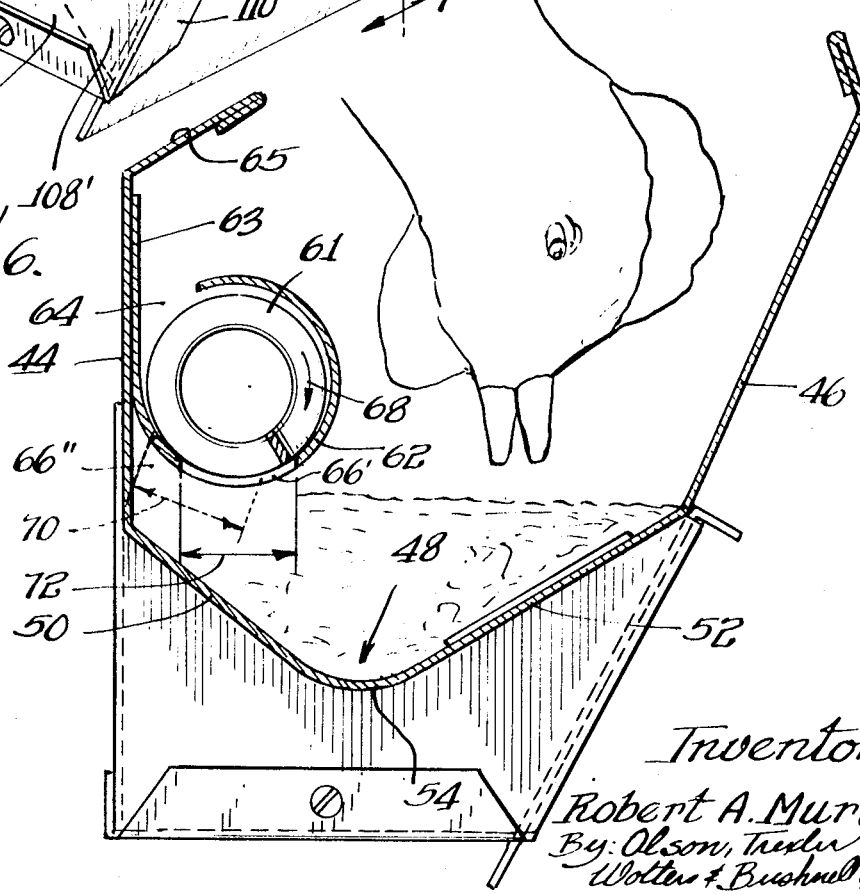

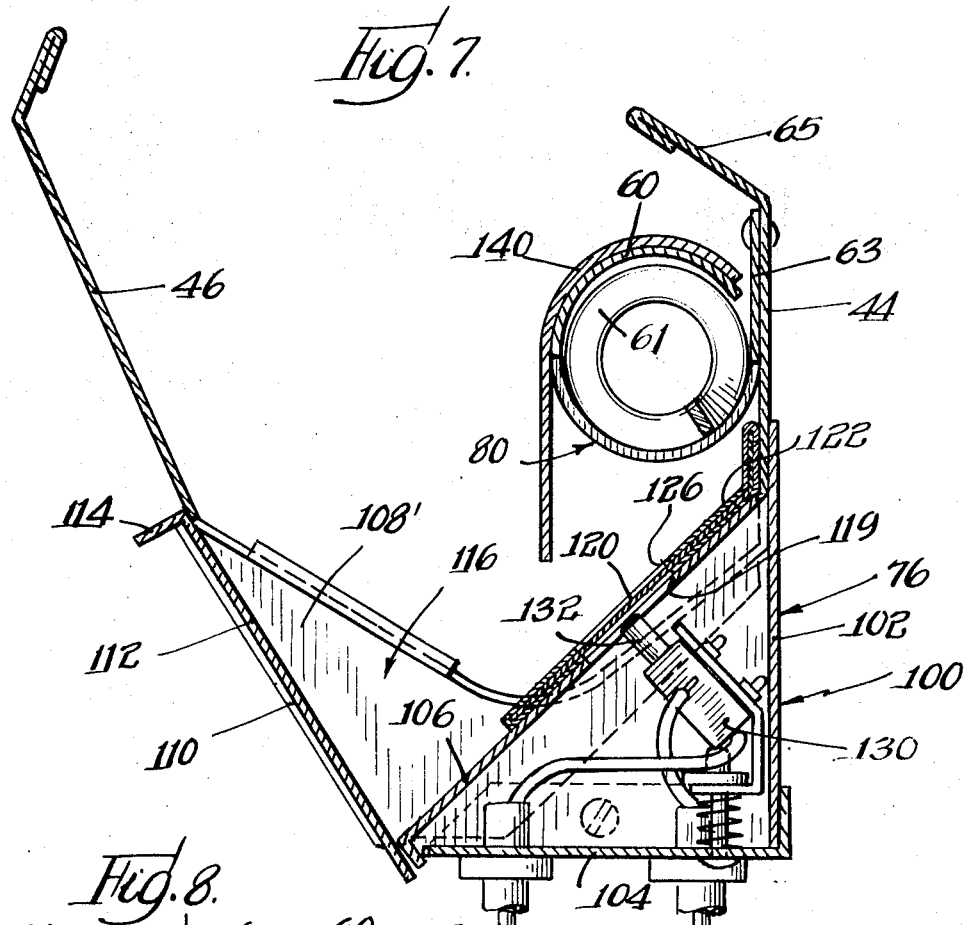

TROUGH-TYPE POULTRY FEEDERS

BACKGROUND OF INVENTION

This invention relates generally to poultry raising apparatus, and more particularly to a system for automatically distributing feed to poultry or the like housed in cages.

In numerous poultry raising operations it is the general practice to keep the birds in cages arranged in rows throughout the poultry house. In these installations, each row may include groups of oppositely facing, aligned cages, with aisles between the respective rows.

In installations of the type mentioned above, an efficient and automatic system for providing food and water to the caged birds is required in order for the operation to be feasible economically. Numerous mechanical poultry feeder arrangements for effecting this end result are known in the art. These arrangements normally include a plurality of feeder lines which are disposed adjacent the individual cage groups. Each line includes either continuous or interrupted trough structure into which the feed is deposited for consumption by means of conveyor apparatus. These feeder lines are normally supplied by a main delivery line associated with a storage bin.

Systems of this general type are controlled by a master timer which activates the system at preselected periods during the day, depending upon the specific species of poultry being raised. However, for the profitable raising of poultry it is necessary that the amount of feed supplied and consumed be controlled to avoid waste as well as over feeding.

One form of system in use, and similar to the present invention, utilizes a control station at which the level of feed is monitored, and distribution controlled accordingly. While this particular arrangement has operated with some degree of satisfaction when compared with those systems previously available, numerous problems still existed unsolved. Certain of these are solved by the present invention, as discussed hereinafter.

The feeds used for poultry are normally nonhomogeneous, in that they are a mixture of whole kernels, grain, mash, pellets, and other ingredients. The birds, are quite selective and will rigorously bill the feed in search of preferred morsels. This action is what one observes when he views a flock of chickens, or the like "pecking" at their food. With large flocks of poultry it is necessary to debeak the birds, i.e., clip off a portion of their beak, in order to prevent the birds from injuring or destroying each other. This clipping results in a beak with a flat hammerlike end surface such that the birds pecking or billing their feed tends to pack it into any sharp corners existing in the feeder line trough.

When this happens the feed soon spoils and contaminates the trough, thus requiring periodic and troublesome cleaning operations. To avoid this problem, certain prior art systems utilized mechanical apparatus to effect continuous stirring of the feed. With the present invention, the specific configuration of the feeding trough is such that packing of the feed is prevented, and in fact the bird' billing action produces desirable agitation of the feed.

Another drawback of the forementioned systems is their inability to assure even distribution of nonhomogeneous feeds. In all automatic poultry systems, elongate troughs or series of feeding stations are used, with each feeder line extending for considerable distances; it is not uncommon for these to extend for 200 feet or more. The conveyor means for transporting the feed usually produces a continuous churning action, such that the denser feed particles tend to settle to the bottom, with the lighter, larger particles migrating to the top. Accordingly, this separation results in the heavier, denser feed ingredients being distributed first, with the lighter particles traveling the length of the conveyor and being distributed only at the more remote ends of the line. This uneven distribution of the feed is undesirable and must be avoided in order to achieve balanced feeding, a result obtained with the present invention.

Further, in addition to the above-discussed problems, the prior art feed-dispensing apparatus have evidenced undependability with regard to the control means provided. Generally, each feeder line includes a conveyor motor which is selectively energized and deenergized in relation to the amount of feed accumulation at the control station. However, due to the contaminated environment in which the control apparatus must operate, failure of switches, relays, and other electrical apparatus is not uncommon. Also, since it is necessary to provide some sort of sensing element, or the like, to monitor the feed level, quite often while billing their feed the birds will actuate this element to discontinue prematurely the feed distribution. The control apparatus of the present invention completely avoids these problems.

SUMMARY OF THE INVENTION

In order to overcome the aforementioned problems and to provide the discussed advantages, was well as others which will be apparent from the following detailed description of the illustrated embodiment, the present invention provides a novel trough construction that is free from sharp corners or the like, so as to preclude packing of feed and promote continued agitation thereof by the billing action of the birds. Further, this invention also provides an improved conveyor tube arrangement which achieves more even distribution of the feed along the length of the trough. Also, the present invention utilizes improved control apparatus which assures dependable, accurate and trouble free operation of the system.

DESCRIPTION OF THE DRAWINGS

FIG. 1 is a simplified, partial perspective view showing a poultry house having aligned groups of cages positioned in rows with the feeder lines running parallel thereto; each said feeder line being supplied by the main delivery system.

FIG. 2 is a sectional view, taken through the row of cages illustrated in FIG. 1 and showing the disposition of the feeder lines with respect to various cages.

FIG. 3 is a fragmentary, perspective view of a section of the novel trough member of the present invention.

FIG. 4 is a bottom view of the auger tube employed with the trough section of FIG. 3, and illustrating the staggered positioning of the dispensing apertures in said tube.

FIG. 5 is a fragmentary perspective view of the control station employed with the feeder line of FIG. 1.

FIG. 6 is a sectional view of the trough assembly illustrated in FIG. 1, and showing how feed is dispensed from the conveyor apparatus.

FIG. 7 is a sectional view, taken along the line 7—7 of FIG. 5 in the direction indicated; note this view includes a shield member carried by the auger tube; which member has been deleted from FIG. 5 for purposes of clarity.

FIG. 8 is a sectional view taken through the auger tube of FIG. 7 and showing a plug member in position proximate the dispensing opening in said tube.

FIG. 9 is a sectional view taken along the line 9—9 of FIG. 8 in the direction indicated.

FIG. 10 is a schematic diagram of one form of the control circuit that may be employed with the illustrated embodiment.

DESCRIPTION OF THE ILLUSTRATED EMBODIMENT

Referring now more specifically to the drawings, wherein like parts are designated by the same numerals throughout the various figures, a poultry installation incorporating the apparatus of the present invention is shown in FIG. 1. This installation includes a plurality of rows of cages, designated generally 10, each row 10 being comprised of oppositely facing upper and lower groups of cages, 12 and 14, respectively. The rows 10 are constructed or assembled in any suitable manner and are housed within a poultry building 16. The individual cages, designated 18, in FIG. 2, are formed of wire and are sized to accommodate one or more birds.

A poultry feeder line 20 constructed in accordance with the features of the present invention extends parallel to each group of aligned cages 18 and supplies feed to the birds. In general, each feeder line 20 comprises an elongate trough 22, conveyor means including a drive motor 24, and an intake hopper 26 which receives feed from the main delivery line. The conveyor means is operatively coupled with hopper 26 and draws the feed therefrom for distribution along the length of the trough 22.

In the illustrated embodiment, feed is supplied to the individual feeder lines 20 from a bulk storage bin 28 by means of a main delivery system designated generally 30. The main delivery system includes a receiving hopper 32, a delivery line 34, and a return line 36. The feed is supplied to the individual intake hoppers 26 by a plurality of drop lines 38. Any excess feed is returned to the hopper 32 by means of the return line 36. This is achieved by a return box 40 mounted at the far end of the delivery line 34, which accepts the excess feed and channels it to the return line 36. Accordingly, there is little or no waste of feed in the main delivery system as any excess is continually recirculated to the main distributing point, i.e., receiving hopper 32.

As will be detailed more completely hereinafter, the main control apparatus for the overall system is set to provide for feeding only at selected periods during the day. Accordingly, at the commencement of one of these feeding cycles the main delivery system and the individual feeder lines are energized.

To prevent spillage and overdistribution of feed, a control station, designated generally 42 in FIG. 1, is included in each feeder line 20. At the control station 42 the level of feed in the trough 22 is monitored and the motor 24 operated accordingly, to maintain a selected level. However, upon the termination of the feeding cycle the entire system, including motor 24, is disabled, such that any subsequent drop in feed level at the various control stations does not result in actuation of the respective conveyor means.

Turning then to FIGS. 3-5, the novel construction of the trough 22 of the present invention is illustrated detail. Trough 22 is of a generally U-shaped configuration and is comprised of a first sidewall 44 adapted for disposition adjacent the cages 18; a second sidewall 46 spaced from said wall 44; and a bottom wall 48 interconnecting the respective sidewalls.

As was mentioned previously, one problem encountered with the prior art trough constructions is that the birds tend to pack the feed into the sharp corners of the trough as they continuously bill and peck at the feed. This problem is particularly troublesome in that the packed feed spoils and, if not removed, contaminates new feed being introduced into the trough.

More specifically, the trough construction 22 of the present invention, due to its novel bottom wall shape, obviates the aforediscussed problem. The bottom wall 48 includes a plurality of portions or sections which cooperate with each other and the respective sidewalls 44 and 46 to define a trough section that is free from troublesome sharp corners into which feed can be packed. In this regard, bottom wall 48 comprises a first portion 50 integral with the first sidewall 44 and extending downwardly away therefrom; a second wall portion 52 integral with the second side wall 46 and extends downwardly therefrom toward said first portion 50; and an intermediate portion 54 arcuate in configuration, which interconnects said portions 50 and 52 and provides trough 22 with a rounded bottom.

Looking at FIG. 5, it can be seen that due to the angular disposition of the bottom wall portions 50 and 52, the feed will tend to slide toward the rounded bottom trough 22. Accordingly, as the birds bill or peck at the feed it will be continuously churned or agitated. Also, due to the absence of any sharp corners in said trough 22, the aforementioned problem of packing of the feed is obviated.

A channellike assembly 60, which may be termed an auger tube, is carried by the first sidewall portion 44 of trough 22, to provide for the conveying of feed along the length thereof. As illustrated in FIG. 6, the channellike assembly 60 is adapted to house a flexible auger 61 of the conveyor system. This system also includes the drive motor 24 which is operatively connected to auger 61 such that feed is pulled from the hopper 26 along the length of the tube 60.

The auger tube 60 includes a portion 62 that is of generally circular configuration to conform to the auger element 61. In addition, there is provided an integral planar segment or portion 63 which is spot welded or otherwise attached to the trough wall 44. As can be seen in FIG. 6, the end of the arcuate portion 62 is spaced from the planar portion 63 to provide an elongate slot or opening, which is designated by the reference character 64. Accordingly, as the birds bill or peck at the feed and attempt to discard portions thereof, they will drag it upwardly over the arcuate portion 62, causing said feed to enter the auger tube 60 through the elongate opening 64 for subsequent redistribution.

In addition, trough 22 may include a bib portion 65 which is integral with the sidewall 44 and extends inwardly of the trough to overlie the elongate opening 64. The bib 65 prevents dirt and other contaminants from entering auger tube 60.

The auger tube 60 also includes a plurality of openings 66 formed therein which allow the feed to drop into the lower regions of the trough 22. While the openings 66 are shown to be circular in configuration, it should be noted that this is merely by way of illustration and that openings of various configurations are contemplated.

In the trough sections adjacent hopper 26, the spacing between the auger tube openings 66 is greater than that employed in those sections proximate the more remote end thereof. In this regard, it should be noted that as the conveyor apparatus commences to draw feed from hopper 26, distribution will initially commence at those openings adjacent the hopper 26, with the more remote trough sections, especially control section 42, receiving feed only after considerable amounts have been deposited at the upstream sections. Accordingly, to overcome this delayed distribution, the openings 66 at the more remote portions of the trough are more closely spaced, to allow more feed to drop per unit time. Alternately, one or more restricting members which may be in the form of C-shaped clips 67 snapped over and slidably disposed on the auger tube 60 as shown in FIGS. 3 and 4 can be employed, to completely or partially block the openings 66 and thereby control the amount of feed dispensed.

Feeds of the general type conveyed by the present apparatus normally contain a mixture of whole kernels of grain, mash, pellets, and various other ingredients. Thus, as was alluded to briefly hereinbefore, separation of the particles or elements of the feed during movement precludes even distribution thereof. In this regard, at the initiation of the feeding cycle, the auger tube 60 is not completely filled, such that rotation rolls or agitates the feed. This movement is such that the fine, denser feed particles tend to settle and move along the bottom of the auger tubes 60, while the lighter, less dense particles, such as the whole kernels of grain, migrate to the top. Thus, if the distributing apertures 66 open directly downward, the heavier feed particles will be dispensed first with the lighter particles being conveyed to the more remote regions of the feeder line; a factor substantially hindering even feed distribution.

To overcome this problem, the auger tube 60 of the present invention employs staggered distributing apertures 66. More particularly, directing attention of FIG. 4, the auger tube 60 includes two series of apertures; those of the first series being designated by the reference character 66' while those of the second series are designated by the reference character 66". The apertures 66' have their respective centers located substantially in a common vertical plane such that the apertures open directly downward. Apertures 66" are staggered with respect to apertures 66', in that they are displaced circumferentially from said first series along the periphery of the lower portion of the auger tubes 60 in a direction toward the first sidewall of the trough. Accordingly, due to the presence of the offset apertures 66' between adjacent apertures 66", a substantial length of auger tube bottom wall is provided along which the heavier particles may travel. Further, it should be noted that the degree of offset of apertures 66' is such that they do not totally preclude or inhibit the dispensing of the heavier particles, but merely control this factor. On the other hand, the offset of apertures 66" toward the upper regions of the auger tube promotes dispensing of the less dense feed particles. Thus, it can be seen that the staggered apertures 66' and 66" promote even distribution of the feed.

Further, with reference to FIG. 6 and assuming a right-hand rotation of the auger 61, as indicated by arrow 68, it can be seen that the feed will tend to be displaced toward planar wall portion 63. This displacement, as discussed previously, is readily handled by the staggered arrangement provided by apertures 66' and 66".

Looking now to FIG. 2, note that FIG. 6 represents the situation existing with regard to those cages 18 on the right-hand side of FIG. 2. As to those cages 18 to the left of FIG. 2, the situation illustrated in FIG. 6 is reversed. That is, assuming a right-hand rotation of the respective auger elements 61, the feed is here displaced away from the planar wall 63. Due to the relatively wide zone of distribution represented by the dimension arrows 70 and 72, FIG. 6, and defined by said apertures 66' and 66", this reversal is readily accommodated without hindering even distribution of the feed. Further, such being the case, the illustrated auger tube construction 60, and right-hand augers 61, may be employed on both sides of the row 10.

Considering now FIGS. 6 and 7, there is illustrated a preferred construction of the control station 42. It will be recalled that the control station 42 comprises the endmost portion of the feeder line 20 and is disposed proximate the conveyor motor 24. Briefly, control station 42 includes monitoring apparatus, designated generally 76, that is operably connected to the conveyor motor 24 such that when the accumulation of feed at said station reaches a preselected level, motor 24 is deenergized. However, should the level of feed at station 42 drop below the aforementioned preselected value, prior to the termination of the feeding cycle, the monitoring apparatus 76 will energize conveyor motor 24 to provide additional feed distribution. On the other hand, should this drop in level of the feed occur after termination of the feeding period, the conveyor motor 24 will be disabled and cannot be energized via the monitoring apparatus 76.

Looking now to the specific construction of the control station 42, a portion of the trough bottom wall 48 at this location is removed to provide an aperture, designated by reference character 78. The monitoring apparatus or assembly 76 is constructed to be received within aperture 78, so as to be positioned with respect to trough 22 as illustrated in FIGS. 6 and 7.

The construction of the auger tube 60 at control station 42 is altered somewhat from that discussed previously. In this regard, the dispensing apertures 66 are replaced with an elongate, semicircular opening 80. The function of the opening 80 is to assure that all of the feed that has bypassed the preceding dispensing apertures 66 will be expelled from the auger tube 60 at the control station 42.

To assist in expelling and directing the feed from opening 80, a plug element 82 may be inserted in the auger tube 60. This arrangement is illustrated in FIGS. 8 and 9.

With the movement of the feed as indicated by the arrow 84 in FIG. 8, the plug 82, which has a baffle or flange element 86 at one end thereof, is positioned within and affixed to the auger element 61 for rotation therewith. With the plug 82 so positioned, feed cannot move past the flange 86. Accordingly, by adjusting the position of said flange 86 relative to the opening 80, it is possible to direct the distribution of feed over a selected portion of the monitoring apparatus.

Plug 82 split longitudinally and is comprised of upper and lower portions 90 and 92, as illustrated in FIG. 9, with one said portion carrying the flange 86. A setscrew arrangement 94 interconnects the upper and lower portions 90 and 92. In addition, the semicircular flange 86 includes an opening 96 which permits the plug 82 to be threaded within the auger 61. Thus, once the plug has been threaded to the desired position relative to opening 80, the setscrew arrangement 94 may be employed to effect relative movement of the upper and lower portions 90 and 92, causing said portions to engage the inner peripheries of the spiral auger 61 and thus fix the position of said plug 82 relative to the auger, such that said plug will rotate therewith.

The monitoring assembly 76 includes primarily a triangular shaped housing 100 which contains the means for monitoring the feed level and operating the conveyor motor 24, as will be discussed more completely hereinafter. Specifically, the housing formation 100 is comprised of, a sidewall 102; a base 104 connected to the lower edge of wall 102, a sloped wall 106 joining the free edge of the base 104 and wall 102 to define a triangular shaped space; and a pair of end plates 108 closing said space. The end plates 108 include arm portions 108' which extend outwardly of the housing formation 100, as illustrated in FIG. 7. Each said arm portion 108' has an inwardly directed flange 110 at the end thereof.

Disposed between the portions 108' and maintained in position relative thereto by the flanges 110 is a removable panel section 112. The upper end of panel 112 has an outwardly turned tab 114 which abuts against the flanges 110 and provides means that may be grasped upon removal thereof. As can be seen in FIG. 7, the lower edge of the sloped wall 106 is juxtaposed the lower portion of panel 112 to provide the monitoring assembly 76 with a V-shaped pocket 116; this being in addition to the housing formation 100.

The monitoring assembly 76 is mounted to the trough 22, by disposing it within opening 78. That is, inviting attention to FIG. 7, the inner surface of panel 112 and the sloped wall 106 of housing 100, in conjunction with the arm portions 108' close said opening 78, with the U-shaped pocket 116 being disposed below the level of the trough bottom wall 48. Accordingly, this configuration permits the monitoring apparatus 76 to be underslung with respect to said bottom wall 48, and obviates the need for a special trough section to handle the monitoring apparatus at the control station. That is, the monitoring apparatus 76 can be disposed at any desired location along the length of a standard trough section 22. All that need be done, is to cut out a portion of the bottom wall 48 to provide the opening 78, and the positioning of said apparatus 76 therein. The advantages from a manufacturing standpoint and the savings in production costs realized by the elimination of a specially constructed trough section for the control station are believed obvious and require no further elaboration.

The remaining components of the monitoring assembly 76 can best be viewed in FIG. 7 which is a sectional view taken through the housing 100. In this regard, the sloped wall 106 is provided with an aperture 119, over which is disposed a sensing element in the form of a flexible diaphragm 120. The diaphragm 120 is carried by a retainer frame 122 which has its edges crimped over to firmly engage said diaphragm 120. In addition, the retainer 122 has an aperture 126 corresponding in shape to the aperture 119. Accordingly, the retainer 122 is affixed to wall 106 with the respective apertures 119 and 126 aligned, such that the exposed portion of diaphragm 122 is all that separates the interior of the housing 100 from that of the trough.

Thus, as the feed drops from opening 80 into the trough 22, it will slide down the sloped surface of wall 106, which now includes the retainer frame 122. Feed will accumulate in the V-shaped pocket 116, and once it reaches the level of the exposed portion of diaphragm 120 the weight thereof will produce a bulging or flexing of said diaphragm toward the interior of housing 100, which movement is used to initiate operation of the control cycle to deenergize conveyor motor 24.

Considering now FOG. 7, a switch 130 is mounted interiorly of the housing 100, which switch includes a spring biased actuator arm 132 disposed immediately adjacent that portion of the flexible diaphragm 120 encircled by aperture 119. The switch 130 is a normally closed switch which is connected in circuit with the conveyor motor 24. Accordingly, the bulging of diaphragm 120 produces corresponding movement of arm 132 which indexes switch 130 to the opened condition to disable conveyor motor 24. However, as the poultry feeding at the control station 42 reduce the level of feed in pocket 116 below the exposed portion of diaphragm 122, the spring biased actuator arm 132 will be urged back to its initial condition to again close switch 130 and permit reenergization of the conveyor motor 24.

In FIG. 10 there is illustrated schematically one form of control circuit that can be employed to attain the above-noted operation. More specifically, a timer 136 is utilized in conjunction with a switch 138 which controls the supply of power to all of the feeder lines as well as the main supply system. Accordingly, at the commencement of the feeding cycle programmed into said timer, switch 138 closes to provide power to the lines leading to the various drive motors. Due to the normally closed condition of the switches 130 at the respective control stations, a completed circuit is provided and the distribution of feed to the individual troughs will commence. However, as the feed at the control station accumulates, switch 130 will be operated, thus breaking the circuit to motor 24 and discontinuing distribution of feed. As mentioned above, should the level of feed at these control stations 42 drop the biasing force on arm 32 will index it to its initial position, thus closing switch 130 and recommencing distribution of feed; provided, however, that the timer 136 has not completed its cycle and opened switch 138, which disables the entire feeding system.

In addition, redirecting attention to FIG. 7, a shield member 140 may be used at the control station to preclude inadvertent premature operation of the monitoring apparatus. The shield 140 is attached to the auger or conveyor tube 60 proximate opening 80 and above the exposed portion of diaphragm 120. This shield extends downwardly from said tube 60, but is spaced from the sloped wall 106. Thus, while the feed can slide along wall 106 into pocket 116 unhampered by shield 140, it is impossible for the birds to engage the diaphragm and close switch 130.

While a preferred embodiment of the present invention is illustrated and described, it is envisioned that those skilled in the art may change certain structural details without departing from the spirit and scope of the invention.

The invention is claimed as follows:

1. Apparatus for distributing feed to poultry housed within cages, said apparatus comprising:
   an elongate trough for the reception of feed and adapted for disposition adjacent said cages;
   distributing means within said trough for conveying feed and depositing said feed along the length of said trough;
   said trough including,
   i. a first sidewall for disposition adjacent said cages,
   ii. a second sidewall spaced from said first wall and connected thereto by a bottom wall section,
   iii. said bottom wall section having a first portion integral with said first sidewall and extending downwardly and inclined away therefrom, a second portion integral with the second sidewall and extending downwardly and inclined away from said second sidewall toward said first portion, and an arcuate portion interconnecting said first and second bottom wall portions to provide said trough with a rounded bottom;
   whereby, the trough configuration promotes continued shifting of said feed and inhibits packing thereof during working by the poultry.

2. Apparatus as defined in claim 1 wherein said first sidewall of the trough is a vertical wall.

3. Apparatus as defined in claim 1 wherein said second trough sidewall extends upwardly and away from said bottom wall section at an acute angle with the vertical plane.

4. Apparatus as defined in claim 1 wherein said distributing means includes, an elongate channellike assembly affixed to said first sidewall and spaced above said arcuate bottom wall portion, and conveyor means associated with said channellike assembly for transporting feed along the length thereof.

5. Apparatus as defined in claim 4 wherein said channellike assembly includes a lower section having a plurality of dispensing openings formed therein such that feed may drop from said assembly into the lower regions of said trough.

6. An apparatus as defined in claim 5 which includes restrictive members associated with dispensing openings in said channellike assembly for controlling the amount of feed dispensed through said opening.

7. Apparatus as defined in claim 4 wherein said conveyor means includes an auger disposed in said channellike assembly, and drive means for said auger, such that feed may be pulled along the length of said channellike assembly and deposited in said trough.

8. Apparatus as defined in claim 4 wherein said channellike assembly includes an arcuate lower wall section having a plurality of spaced openings formed therein and extending along the length of said assembly.

9. Apparatus as defined in claim 8 wherein said spaced openings are staggered with respect to their circumferential positioning about said arcuate lower wall section of the channellike assembly, such that upon the dispensing of a nonhomogeneous feed even distribution of feed particles is attained.

10. Apparatus as defined in claim 8 wherein said spaced openings are defined by two series of alternately staggered apertures, one said series having the respective centers disposed approximately in a vertical plane, the apertures of said other series being displaced circumferentially from said first series along the periphery of said arcuate lower wall section and toward said first sidewall of the trough.

11. Apparatus as defined in claim 1 wherein said distributing means includes a drive motor; and control means associated with a selected segment of said trough, said control means being operable to deenergize said drive motor when the accumulation of feed at said segment reaches a predetermined level.

12. Apparatus as defined in claim 11 wherein said control means is operable to reenergize said drive motor once said accumulation of feed falls below said predetermined level.

13. Apparatus as defined in claim 11 wherein said control means includes a sensing element positioned in said trough, said sensing element being mounted for relative movement which is effected upon the accumulation of feed above said preselected level.

14. Apparatus as defined in claim 13 wherein said control means further include a normally closed switch in circuit with said drive motor, said switch being operably connected to said sensing element whereby said relative movement of the element indexes said switch to the open condition to deenergize said drive motor.

15. Apparatus for distributing feed to poultry housed within cages, said apparatus comprising: an elongate trough for the reception of feed and adapted for disposition adjacent said cages; distributing means within said trough for conveying feed and depositing said feed along the length of said trough; said trough including, a first sidewall for disposition adjacent said cages, a second sidewall spaced from said first wall and connected thereto by a bottom wall section, said bottom wall section having a first portion integral with said first sidewall and extending downwardly and away therefrom a second portion integral with the second sidewall and extending downwardly and away from said second sidewall toward said first portion, and an arcuate portion interconnecting said first and second bottom wall portions to provide said trough with a rounded bottom; whereby, the trough configuration promotes continued shifting of said feed and inhibits packing thereof during working by the poultry, said distributing means including a drive motor; and control means associated with a selected segment of said trough, said control means being operable to deenergize said drive motor when the accumulation of feed at said segment reaches a predetermined level, said control means including a sensing element positioned in said trough, said sensing element comprising a flexible diaphragm member, said diaphragm being flexed under the weight of accumulated feed to provide for relative movement thereof which may be employed to deenergize said drive motor.

16. Apparatus as defined in claim 15 wherein said control means further include a normally closed switch in circuit with said drive motor, said switch having an operating arm disposed immediately behind said diaphragm, such that outward flexing of said diaphragm results in movement of said operator arm which indexes said switch to the open position and deenergizes said drive motor.

17. Apparatus as defined in claim 15 wherein said diaphragm is disposed at an angle with respect to the vertical plane such that feed as it falls from the distributing means or is worked by the poultry will slide away from the diaphragm toward the bottom of the trough.

18. Apparatus as defined in claim 13, further including a shield member positioned within said trough in such a manner as to prevent direct engagement of said sensing element by the poultry, while permitting the unhindered accumulation feed.

19. A trough construction for use with poultry feed distributing apparatus, said trough including a first sidewall, and elongate, channellike assembly carried internally of said trough and substantially against said first sidewall, said channellike assembly being adapted for use as a component in a conveyor for distributing feed to said trough, said channellike assembly including a lower section having a plurality of apertures formed therein which open generally downward such that feed may drop from said channellike assembly into lower regions of said trough, said trough further including a second sidewall spaced from said first sidewall and connected thereto by a bottom wall section, said second sidewall also being spaced substantially outwardly away from said channellike assembly, said bottom wall section having a first portion integral with said first sidewall and extending downwardly and inclined outwardly away therefrom and beneath and in spaced relationship to said channellike assembly, a second portion integral with the second sidewall and extending downwardly from said second sidewall towards said first portion, and an intermediate arcuate portion interconnecting said first and second bottom wall portions to provide a rounded trough bottom, said arcuate portion being beneath and offset outwardly from said channellike assembly for facilitating poultry reaching the rounded trough bottom.

20. A trough construction as defined in claim 19 wherein said elongate channellike assembly is tubular and adapted to accommodate an auger member of said conveyor arrangement.

21. A trough construction as defined in claim 20 wherein the arcuate lower wall section of said tubular channellike assembly includes a plurality of spaced dispensing openings.

22. A trough construction as defined in claim 21 wherein said spaced openings are staggered with respect to their circumferential positioning about said arcuate lower wall section, such that even distribution of feed particles is attained.

24. A trough construction as defined in claim 21 wherein said spaced openings are defined by two series of alternately staggered apertures, one said series having the respective centers disposed approximately in a vertical plane, the apertures of said other series being displaced circumferentially from said first series along the periphery of said arcuate lower wall section and toward said first sidewall of the trough.

24. In a trough construction for use as feed-dispensing apparatus, said trough being a generally U-shaped configuration and including spaced sidewalls interconnected by a bottom wall, the combination therewith of an elongate auger tube assembly carried by one of said trough sidewalls in spaced relation to said bottom wall, said auger tube being of a generally circular configuration and adapted to have an auger member disposed therein, a lower arcuate wall section of said auger tube including a plurality of spaced openings which are staggered with respect to their circumferential positioning about said arcuate lower wall section, such that upon the dispensing of a nonhomogeneous feed even distribution of the feed particles is attained.

25. The combination as defined in claim 24 wherein said auger tube includes a substantially flat upstanding sidewall portion secured to said one sidewall of the trough, said spaced, staggered openings are defined by two series of alternately positioned apertures, one said series having the respective centers thereof disposed approximately in a vertical plane containing the longitudinal axis of said tube, the apertures of said other series being displaced circumferentially from said first series along the periphery of said arcuate lower wall section and toward the sidewall carrying said auger tube.

26. Apparatus for distributing feed to poultry, said apparatus comprising trough means receiving the feed for consumption by the poultry; and distributing means associated with said trough means for conveying and depositing feed along the length of said trough, said distributing means including conveyor apparatus having a drive motor: the combination therewith of control apparatus associated with a selected portion of said trough means to monitor the accumulation of feed at said section and deenergized said drive motor once the accumulation of feed reaches a predetermined level, said control means including; a flexible diaphragm member defining a portion of the trough wall at said selected segment, and switch means in circuit with said drive motor, said switch being operably connected to said diaphragm whereby the flexing thereof under the weight of accumulated feed indexes said switch to deenergize said drive motor.

27. Apparatus as defined in claim 26 wherein said diaphragm is disposed at an angle with respect to the vertical plane such that feed deposited onto said diaphragm will slide away toward the bottom of the trough.

28. Apparatus as defined in claim 26, further including a shield member positioned within said trough in such a manner as to prevent direct engagement of said diaphragm by the poultry 29. An apparatus for distributing feed to animals comprising elongated trough means for receiving feed for consumption by the animals, distributing means mounted within said trough means and above a bottom wall of the trough means for distributing feed onto said bottom wall along the length of the trough means, said distributing means including a drive unit, control means for controlling said drive unit, said control means including a structure connected with said trough means for defining the feed-receiving receptacle extending below the bottom wall of said trough means, said receptacle including a flexible member defining a wall portion thereof at a level in the vicinity of the trough means bottom wall, and switch means connected with said motor and operable upon flexing of said flexible member under weight of feed accumulated in the receptacle for controlling the drive unit.

30. An apparatus as defined in claim 29, wherein said flexible member is disposed at a position above an adjacent portion of the trough bottom wall.

UNITED STATES PATENT OFFICE
CERTIFICATE OF CORRECTION

Patent No. 3,611,995     Dated October 12, 1971

Inventor(s) Robert A. Murto

It is certified that error appears in the above-identified patent and that said Letters Patent are hereby corrected as shown below:

Col. 1, line 57, change "bird'" to --birds'--
Col. 2, line 17, change "was" to --as--
Col. 3, line 36, after "illustrated" insert --in--
Col. 4, line 62, change "of" to --to--
Col. 5, line 1, change "66'" to --66''--
Col. 5, line 70, after "82" insert --is--
Col. 6, line 71, change "FOG." to --FIG.--

In the numbering of the claims, change the first occurrence of the numeral "24" to --23--

Signed and sealed this 11th day of July 1972.

(SEAL)
Attest:

EDWARD M. FLETCHER, JR.
Attesting Officer

ROBERT GOTTSCHALK
Commissioner of Patents

FORM PO-1050 (10-69)